May 11, 1937.  H. L. COOK  2,079,791
METHOD AND DEVICE FOR LOCATING AND MACHINING PARTS OF APPARATUS
Filed Feb. 5, 1935  7 Sheets-Sheet 4
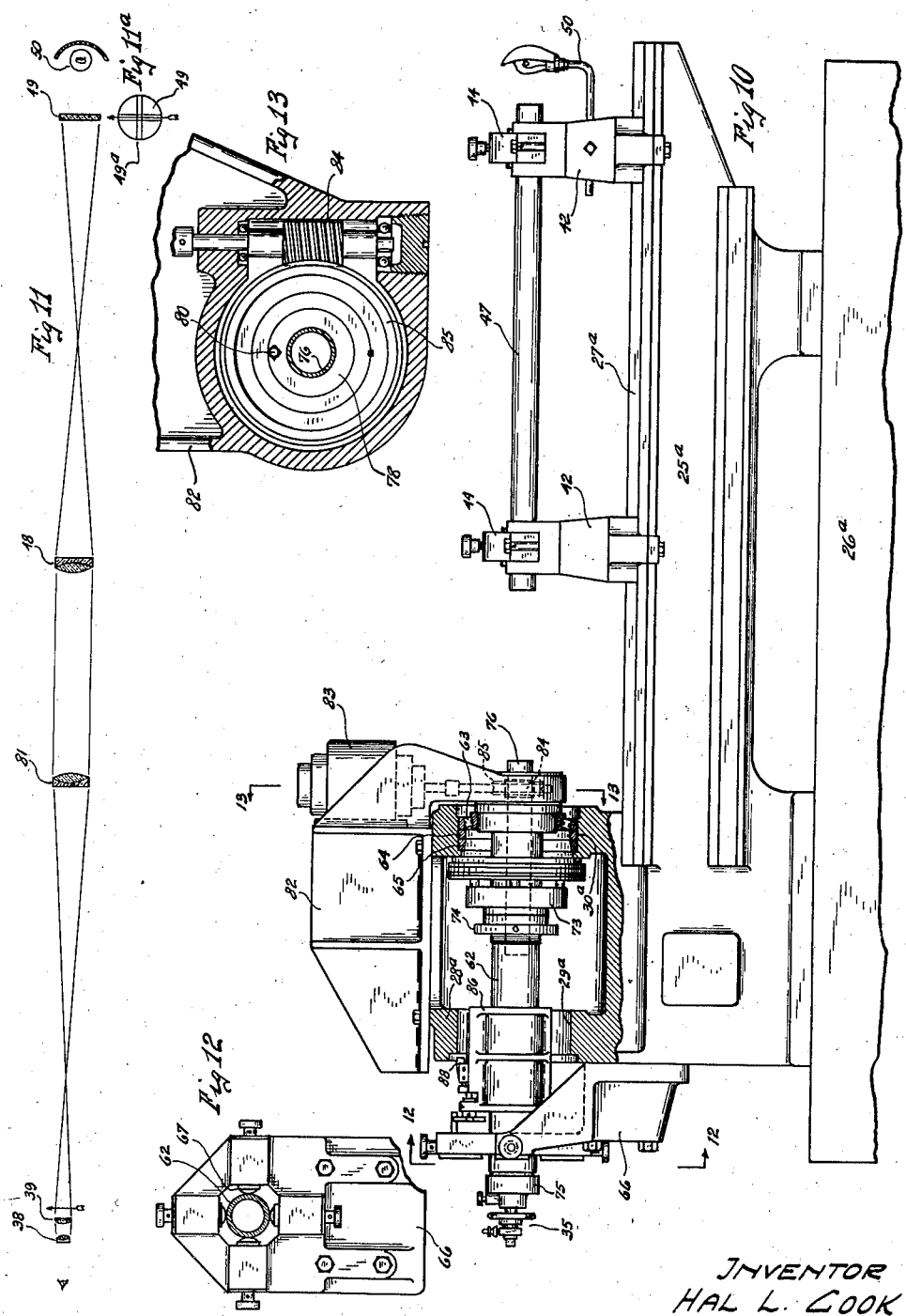
INVENTOR
HAL L. COOK
Kurie Hudson & Kint
ATTORNEYS May 11, 1937. H. L. COOK 2,079,791
METHOD AND DEVICE FOR LOCATING AND MACHINING PARTS OF APPARATUS
Filed Feb. 5, 1935 7 Sheets-Sheet 5

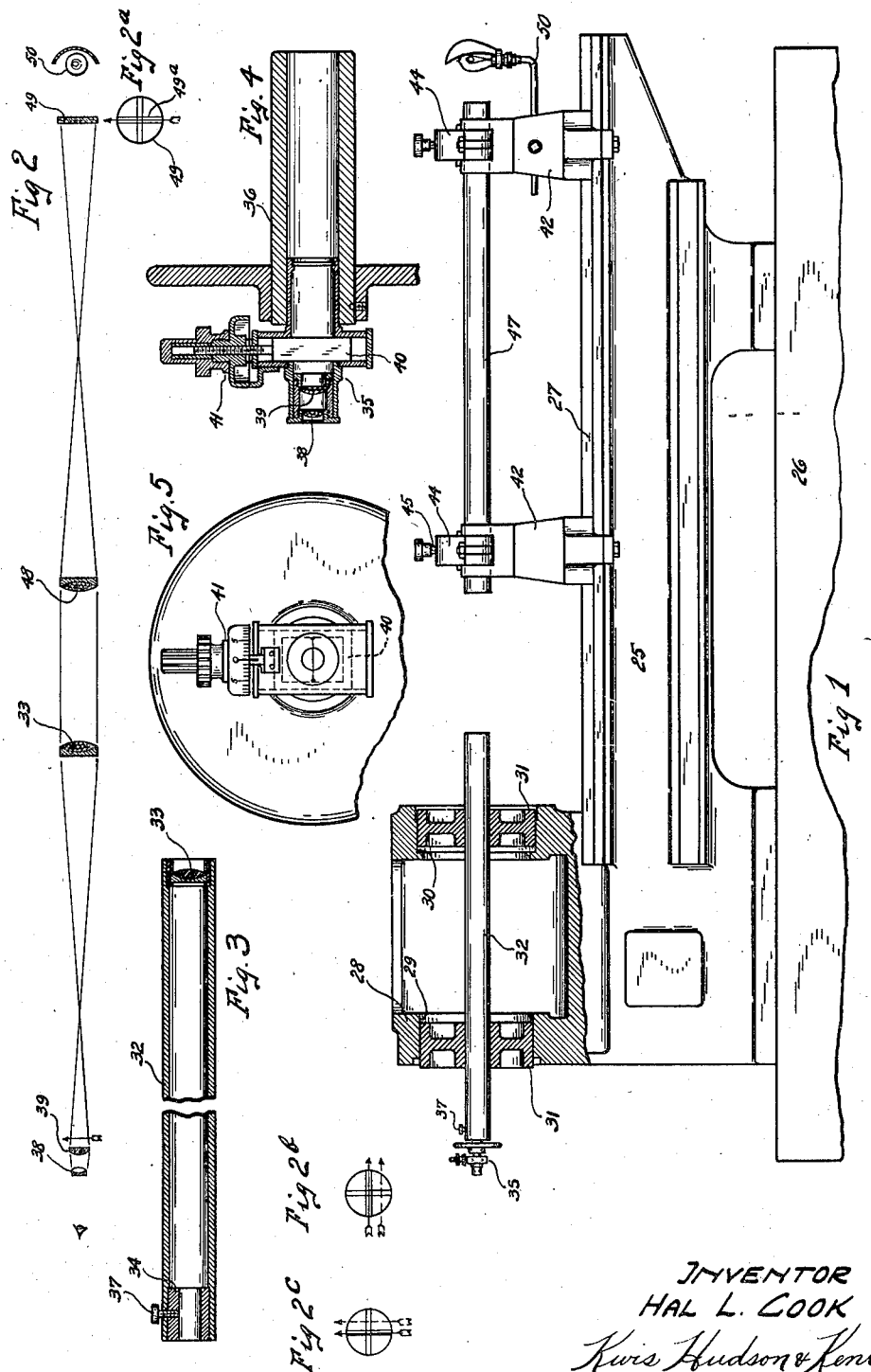

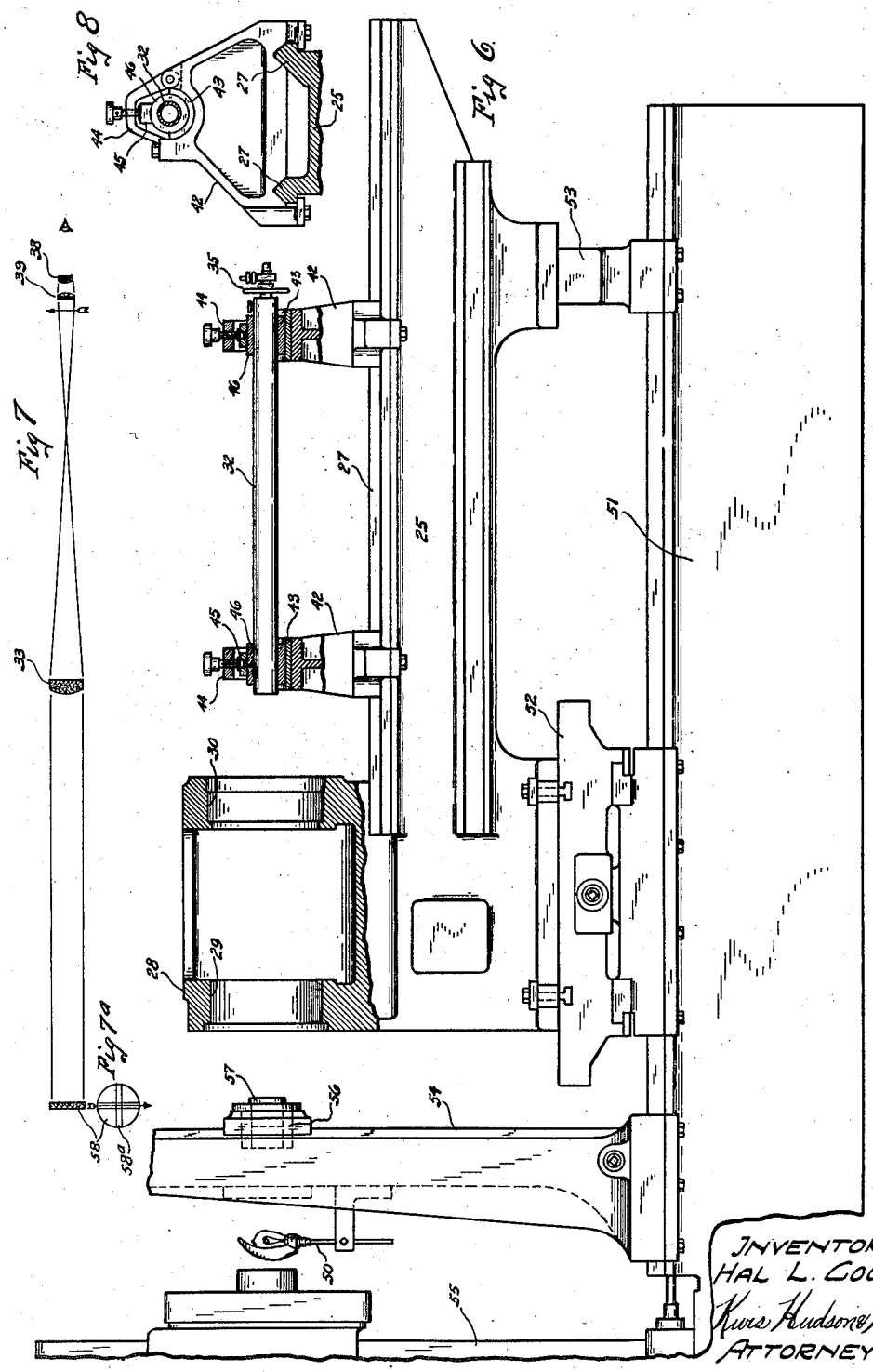

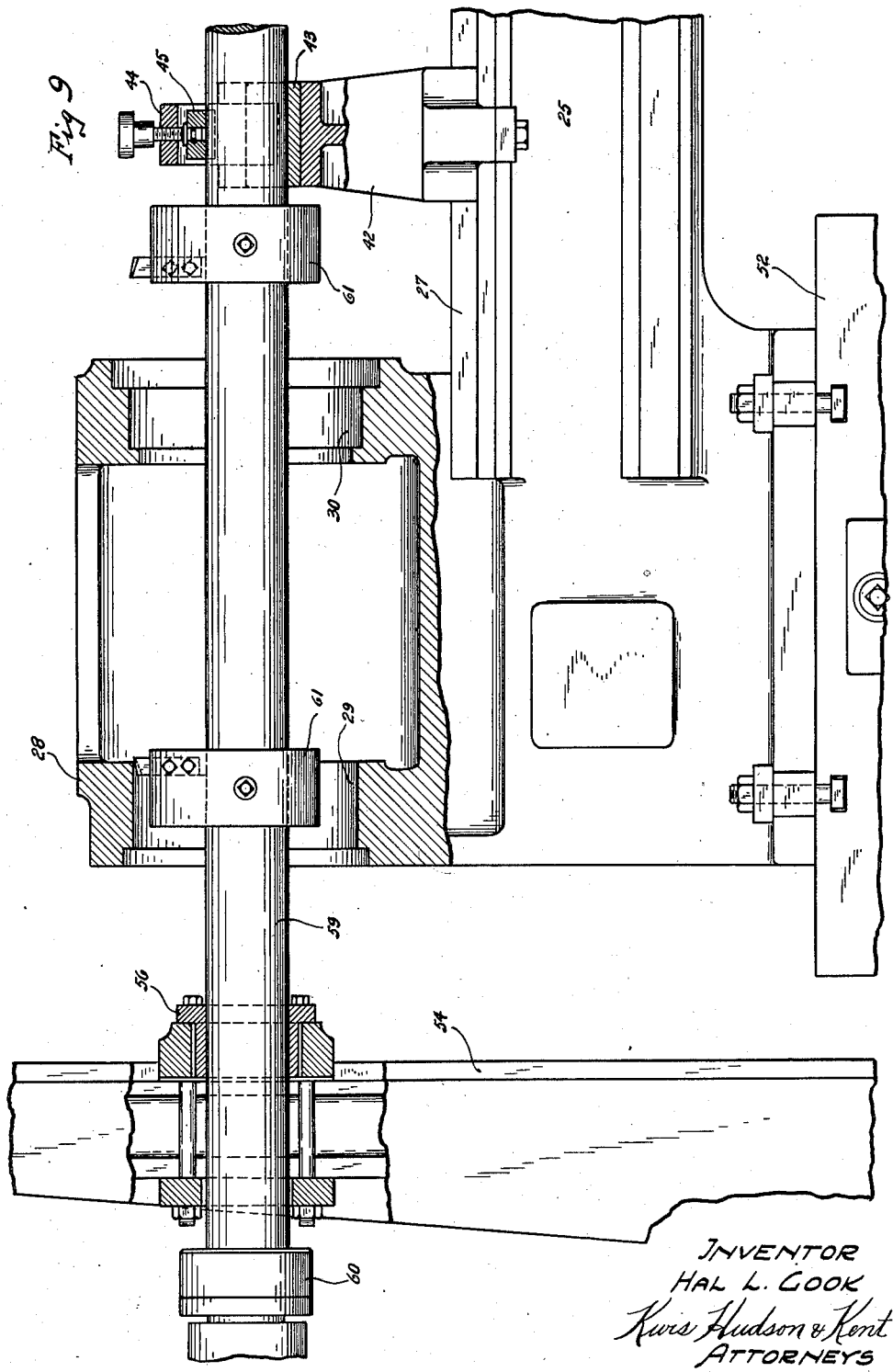

INVENTOR
HAL L. COOK
ATTORNEY

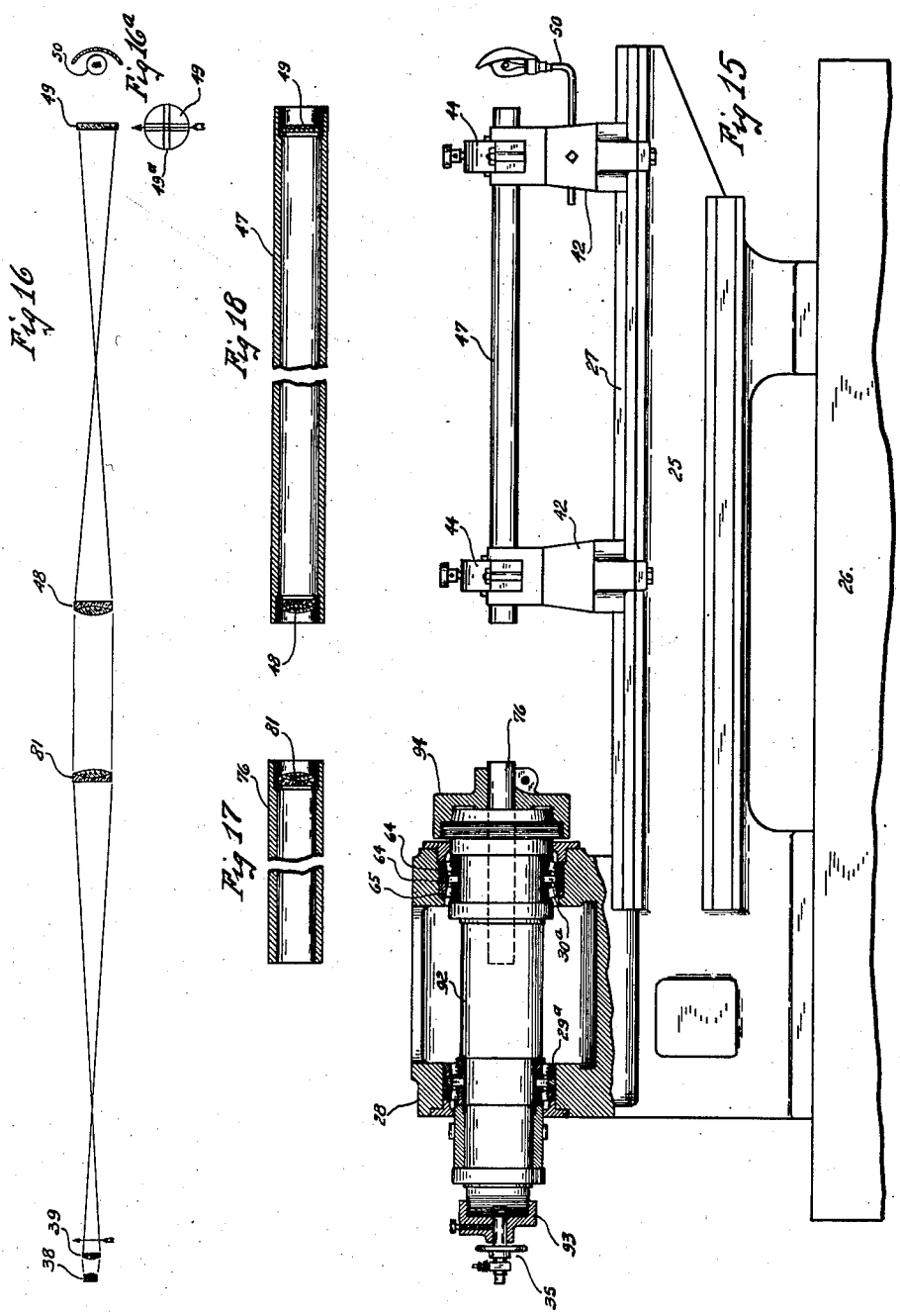

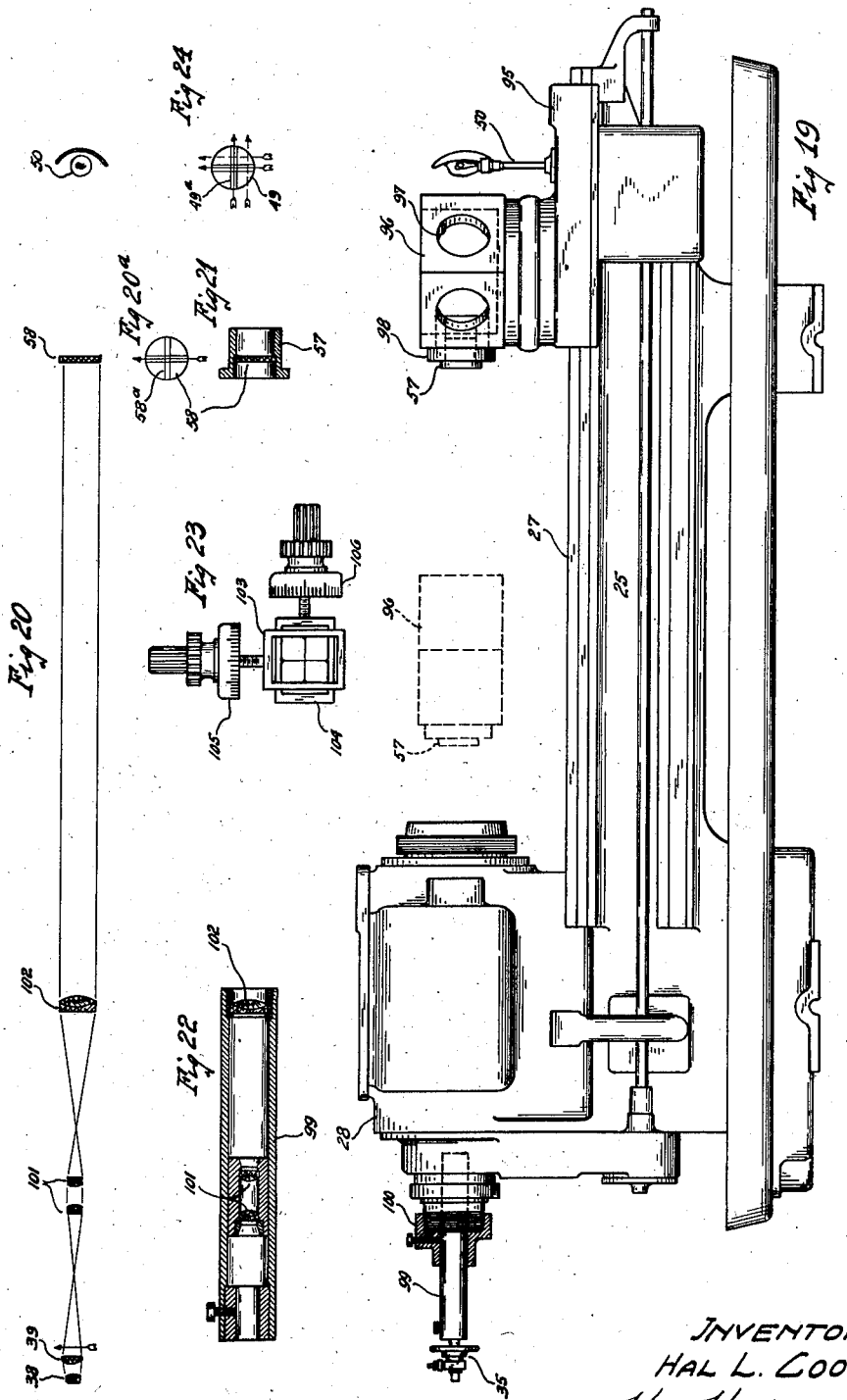

Patented May 11, 1937

2,079,791

UNITED STATES PATENT OFFICE 2,079,791

METHOD AND DEVICE FOR LOCATING AND MACHINING PARTS OF APPARATUS

Hal L. Cook, Cleveland Heights, Ohio, assignor to The Warner & Swasey Company, Cleveland, Ohio, a corporation of Ohio Application February 5, 1935, Serial No. 5,088

10 Claims. (Cl. 82—1)

This invention relates to a method and device for locating and machining the different parts of an apparatus.

An object of the invention is to provide a method and device whereby one part of an apparatus can be accurately positioned and machined with relation to another part of the apparatus.

Another object is to provide a device for determining and checking the relationship between different parts of an apparatus so that any error in such relationship is magnified and is more clearly visualized by the operator.

Another object is to provide a device including an optical system for determining and checking the relationship between different parts of an apparatus and wherein no mechanical tools, such as micrometers, gauges, calipers, and the like, are employed.

Another object is to provide a method whereby an optical system may be employed to accurately locate and facilitate the machining of one part of an apparatus with relation to another part thereof.

A further object is to provide an optical system for accurately locating and enabling the bearing of an apparatus to be machined in alignment with another part of the apparatus.

Another object is to provide an optical system whereby in an apparatus such as a lathe the bearings can be accurately positioned and machined in alignment with the ways or other parts of the apparatus.

A further object is to provide an optical system whereby the relationship between the parts of an apparatus may be conveniently checked to determine whether any misalignment or wear has taken place to destroy the correct relationship between the parts.

Further and additional objects and advantages will become apparent hereinafter during the detailed description which is to follow of several embodiments of the invention.

Referring to the accompanying drawings illustrating several embodiments of the invention, Fig. 1 is a front elevational view partly in section of an apparatus, in this instance a machine tool, embodying one form of the invention;

Fig. 2 is a diagrammatic view of the optical system employed in the apparatus shown in Fig. 1.

Fig. 2a is an end view of the target of the optical system and is taken from the left-hand end of Fig. 2;

Fig. 2b is similar to Fig. 2a with the hair line of the eye-piece of the optical system, shown by the dotted line arrow, displaced with respect to the horizontal hair lines of the target and, by the full arrow, centered with respect to said target hair lines;

Fig. 2c is a view similar to Fig. 2b but shows the arrow representing the hair line of the eye piece located with respect to the vertical hair lines of the target;

Fig. 3 is a detail sectional view of part of the optical system;

Fig. 4 is a detail sectional view of the part of the optical system shown at the left-hand side of Fig. 1 and illustrates an eye-piece provided with a single micrometer slide;

Fig. 5 is an end elevational view of Fig. 4;

Fig. 6 is a front elevational view partly in section of an apparatus such as a lathe bed positioned on a boring mill embodying another form of the invention;

Fig. 7 is a diagrammatic illustration of the optical system shown in Fig. 6.

Fig. 7a is an end view of Fig. 7 looking from the right-hand side of said figure.

Fig. 8 is an elevational view of one of the supports for the optical system shown in Fig. 6 and is taken from the right-hand side of said figure.

Fig. 9 is a fragmentary front elevational view partly in section of the apparatus shown in Fig. 6 and shows the optical system removed from the apparatus and a portion of the device inserted for machining the parts.

Fig. 10 shows a device similar to that shown in Fig. 1 with the optical system of Fig. 1 removed from the bearings and a portion of the device positioned for machining said bearings, which portion carries an optical system similar to the system shown in Fig. 1.

Fig. 11 is a diagrammatic illustration of the optical system employed in the device shown in Fig. 10.

Fig. 11a is an end view of Fig. 11, looking from the left-hand end of said figure.

Fig. 12 is a sectional view taken substantially on line 12—12 of Fig. 10, looking in the direction of the arrows.

Fig. 13 is a sectional fragmentary view taken on line 13—13 of Fig. 10, looking in the direction of the arrows.

Fig. 15 is a front elevational view partly in section of an apparatus, in this instance a machine tool, showing the spindle mounted in the bearings and the apparatus provided with an optical system, Fig. 16 is a diagrammatic illustration of the optical system employed in the apparatus shown in Fig. 15.

Fig. 16a is an end view of the optical system shown in Fig. 16 looking from the left-hand end of Fig. 16.

Figs. 17 and 18 are sectional views of parts of the optical system.

Fig. 19 is a front elevational view of an apparatus, such as a machine tool, with an optical system embodying the invention arranged thereon.

Fig. 20 is a diagrammatic illustration of the optical system employed on the apparatus shown in Fig. 19.

Fig. 20a is an end view of Fig. 20, looking from the left-hand end of said figure.

Figs. 21 and 22 are sectional views of parts of the optical system shown in Fig. 19.

Figure 14:
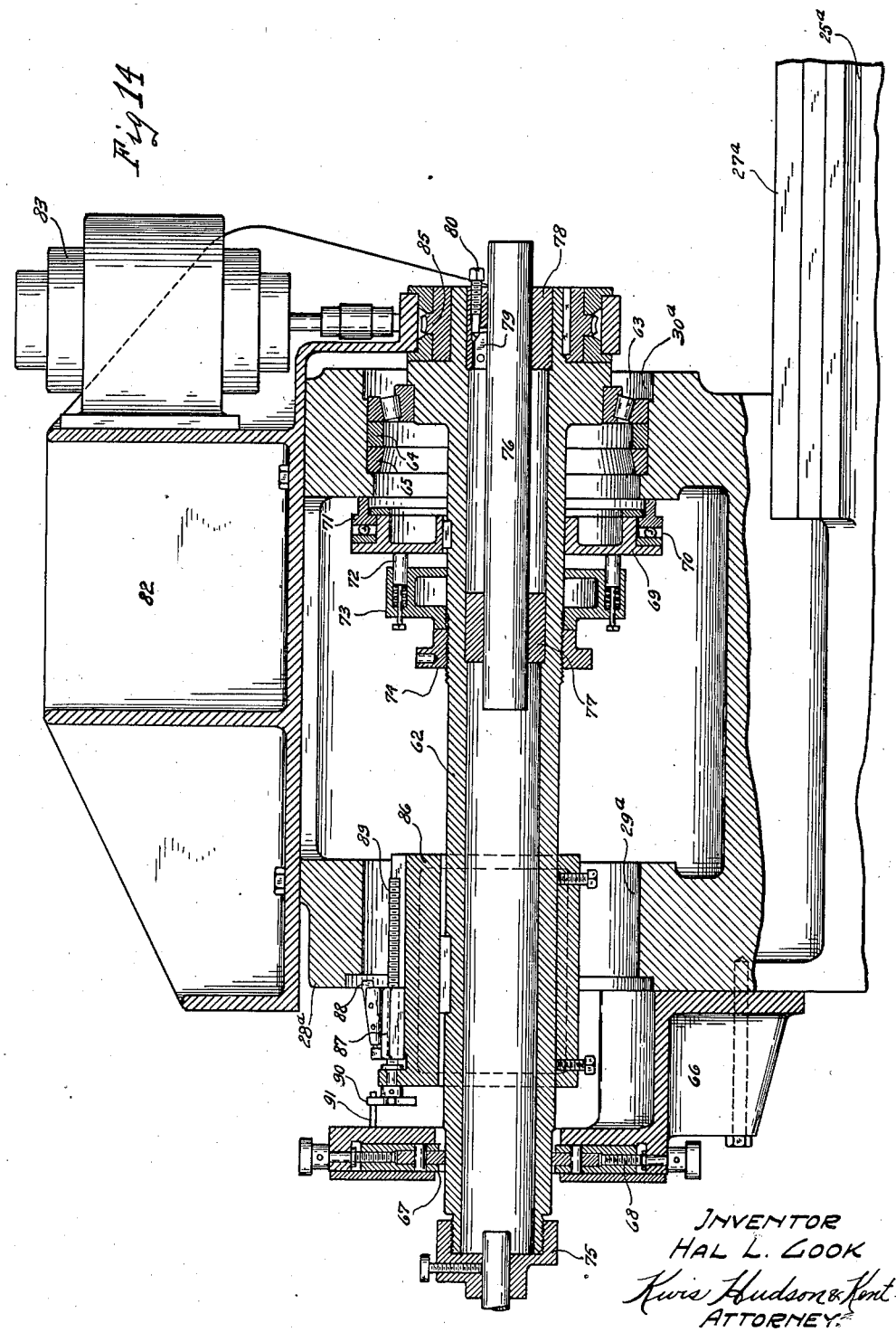
Fig. 14 is an enlarged central sectional view of the left-hand portion of Fig. 10.

Fig. 23 is a detached diagrammatic view of the interior of a modified form of eye-piece from that shown in Figs. 4 and 5 and illustrates a pair of micrometer slides for the eye-piece movable at right angles to each other; and Fig. 24 is a view similar to Figs. 2b and 2c and illustrates combined in a single view what is shown in Figs. 2b and 2c, and what the observer would see if an eye-piece were used embodying the double micrometer slide arrangement shown in Fig. 23.

In the manufacture of apparatus, such as machine tools and other apparatus requiring accurate relationship between the various parts thereof difficulty has been experienced in providing a method and devices for checking, locating and producing the desired relationship between said parts with a high degree of accuracy.

Broadly the present invention contemplates a method and devices whereby the relationship between the parts of an apparatus can be accurately checked, located and produced, as for example, the relationship between the spindle bearings and ways of a machine tool. In carrying out the invention it is contemplated to utilize an optical system whereby the desired high degree of accuracy referred to above may be obtained. Although the invention is susceptible of use in connection with numerous apparatus, it has, in accordance with my present understanding, especial utility with reference to the construction of machine tools and particularly with reference to checking, positioning and machining the bearings for the spindles of machine tools in alignment and/or the proper relationship with the ways thereof. Therefore, by way of example the invention will be described in detail herein as applied to a machine tool and particularly to a lathe.

In Fig. 1 of the drawings the bed casting of a lathe is indicated generally by the numeral 25 and this bed casting preferably is arranged upon an accurately formed supporting surface 26, so that the casting will be maintained in the correct position. It will be understood, however, that in certain instances the casting could be supported in some other way capable of producing a satisfactory support. It will be understood that the casting is provided with the usual ways 27 extending along the front and rear sides of the bed and a head 28, which may be wholly integral with the bed, separate from the bed, or partially separate and partially integral with the bed but which in this instance is illustrated as cast integral with the bed.

The head 28 is provided with a rear bearing opening 29 and a front bearing opening 30 for the spindle of the lathe. It will be appreciated that in a machine tool of this type it is of the utmost importance for the bearing openings 29 and 30 to be in accurate alignment with each other and to be accurately aligned and positioned with respect to the ways 27. The present invention is directed to obtaining this end.

In Fig. 1 the bearing openings 29 and 30 are shown as having been first roughly formed in the head in accordance with the usual practice in machine tool construction. Following the casting of the bed, or forming of the bearing openings in the head thereof and the mounting of the bed upon the supporting surface 26, it being understood that the ways 27 have previously been machined, slightly tapered circular discs 31 are arranged in the bearing openings 29 and 30 and said circular discs have central openings through which a tube 32 forming part of an optical system is inserted and supported. The tube 32 at its right-hand end, as viewed in the drawings, see Fig. 3, is provided with an objective lens 33. The opposite end of the tube 32, that is the left-hand end, as viewed in the drawings, is provided with a bushing 34 in which a micrometer eye-piece, indicated generally at 35, and carried by a sleeve 36 is clamped by means of a set screw 37. The micrometer eye-piece 35 comprises an eye lens 38 and a field lens 39 as well as a slide 40 provided with a hair line indicated as an arrow in Figs. 2, 2a, 2b, and 2c and adjustable transversely of the eye-piece by a micrometer adjusting means 41.

Two or more supporting brackets 42 are mounted on the ways 27 in spaced relation and are then clamped to the ways in the desired position, see Figs. 1 and 8. The supporting brackets 42 on their upper ends are provided with half bearings 43 and hinged sections 44 which may be securely held to the supporting brackets by suitable bolts or other means. The hinged sections 44 are provided with adjustable bearing shoes 45 which, in this instance, act to clamp filler bushings 46 in the half bearing 43, although, as will later be explained, the bushings 46 are not employed during other portions of the method for practicing the invention.

A second tube 47 forming part of the optical system is arranged in and supported by the bushings 46, which tube carries adjacent its left-hand end, as viewed in the drawings, an objective lens 48, and at its right-hand end a target 49, in this instance in the form of a glass disc provided with spaced hair lines arranged in crossed pairs at right angles, as indicated at 49a in Fig. 2a.

It will be understood that the ways 27 and the brackets 42 and their associated parts are accurately formed and when the tube 47 is supported in the brackets it is in exact parallelism with the ways 27. The right-hand supporting bracket 42, as viewed in Fig. 1, carries a removable and adjustable light and reflector indicated at 50 which is so arranged that the light will be in approximate alignment with the tube 47 so that the target 49 will be clearly visible.

It will be understood that the tubes 32 and 47 are so positioned and so located and the lenses carried thereby so arranged that the correct focal distances are provided between the eye-piece and the target.

It will also be understood that in practice the tube 47 is rotated until the cross hair lines 49a on the target 49 are arranged with one pair extending vertically and the other pair extending horizontally. In order to check the alignment of the roughly bored bearings with each other and the parallelism of the bearings with the ways 27 the operator sights through the eye-piece 35 and adjusts the slide 40 by means of the micrometer screw 41 until the hair line in the eye-piece (indicated by an arrow) is extending horizontally and lies midway between the horizontally extending hair lines 49a of the target. He then turns the tube 32 through a half turn to again bring the hair line of the eye-piece in parallelism with the horizontal hair lines of the target. The operator then observes the relationship between the hair line of the eye-piece and the horizontal lines of the target and any displacement therebetween represents double the error existing in the parallel relation between the bearings and the ways in a vertical plane (see Fig. 2b) and can be determined by turning the micrometer screw until the hair line of the eye-piece is midway between the horizontal hair lines of the target. It will be remembered that the operating knob of the micrometer screw is graduated in one-ten thousandths part of an inch, see Fig. 5, and, therefore, the error can be quickly determined. In order to determine the error of displacement in the horizontal plane the operator now turns the tube 32 to bring the hair line of the eye-piece into the vertical position and determines the displacement in the horizontal plane by the micrometric adjustment of the hair line in the manner previously explained, the operator in this instance sighting the vertical hair lines of the target (see Fig. 2c).

Reference is made herein to Figs. 2b and 2c, in the first of which the hair line of the eye-piece is indicated in the horizontal position in the form of an arrow and is shown in dotted lines displaced below the horizontal hair lines of the target, although in other instances it might be displaced above, while Fig. 2c represents the same situation with reference to the vertical lines of the target.

The amount of error existing between the relationship of the roughly bored bearings 29 and 30 and the ways 27 has now been determined and steps may now be taken, if desired, to reduce or minimize any considerable amount of error by readjusting the setting of the usual equipment for roughing the bearings.

In Fig. 6 the lathe bed shown in Fig. 1 is now illustrated mounted upon the table 51 of a boring mill. The lathe bed 25 is clamped at one end to the cross slide table 52 of the boring mill and is supported at its opposite end by a support 53 arranged on and clamped to the ways of the table, it being understood that the support 53 is of such character that the lathe bed 25 is supported in substantially a horizontal plane. Before the lathe bed 25 is mounted upon the table of the boring mill the tubes 32 and discs 31 and tube 47 are removed. A steady rest 54 is supported by the table 51 between the head 28 of the lathe bed and the head 55 of the boring mill. The steady rest 54 supports a vertically adjustable pilot bushing 56 which is provided with a bore into which fits a bushing 57 carrying a target 58 having spaced hair lines in crossed pairs at right angles, as indicated at 58a, see Fig. 20a and 21, which target is similar to the target 49 previously described.

The supports 42 are positioned on the ways 27 of the lathe bed in the desired position and the tube 32 with the eye-piece 35 at the right-hand end thereof is mounted in the supports in the same way as the tube 47 previously described. It will be noted that inasmuch as only the lenses 38, 39 and 33 are included now in the optical system the image represented by the arrow will be inverted, see Figs. 7 and 7a. The operator sights through the eye-piece 35 to learn if the target is aligned vertically and horizontally with the tube 32 which alignment can be secured by adjusting the target vertically on the steady rest 54 and by moving the cross-slide table 52 with the lathe bed thereon in a horizontal plane, the right hand end of the bed sliding on the support 53. The operator now determines the amount of error in the alignment of the target with the tube 32 in both the vertical and horizontal planes in the same way as the errors were determined in the description of Fig. 1. He then corrects the relative positions of the target and tube 32 so that the target is in correct axial alignment with the tube 32, it being remembered that the target can be adjusted vertically and the bed horizontally.

The optical system including the tube 32 with its bushings 46 and the target 58 with its bushing 57 and light 50 is now removed and a boring bar 59 is mounted in the pilot bushing 56 of the steady rest 54 and in the supporting bracket 42 adjacent to the head 28, it being noted that the half bearing 43 of the bracket and the bearing shoe 45 constitute a three-point bearing support for the boring bar. The end of the boring bar 59 is connected by a suitable flexible connection 60 to the spindle in the head 55 of the boring mill so as to be rotated thereby.

Cutter heads 61 having been positioned on the bar 59 and the tools thereof correctly set for boring the bearings 29 and 30, the mill is now set in operation and the bearings 29 and 30 are machined to the desired accuracy. It will be understood that the pilot bushing 56 and target 58 carried thereby have been brought into exact alignment with the tube 32 and therefore the pilot bushing 56 will be in exact alignment with the bearing for the boring bar at the upper end of the supporting bracket 42 and the bearings 29 and 30 will be correctly machined in relationship to the ways 27 of the lathe bed.

In instances where the lathe bed is too large to be conveniently mounted on a boring mill table, the practice followed is that illustrated in Figs. 10 to 14, inclusive, as will now be described. The lathe bed 25a, shown in Fig. 10, is supported on a horizontal surface 26a and comprises the ways 27a and head 28a which has the bearings 29a and 30a. In the present instance the front bearing 30a is finished machined with the conventional tooling in the same set up for, but after the roughing operation.

A boring spindle 62 carrying tools, as will later be explained, is arranged in the head and is supported in the front bearing 30a in the same manner as would be the regular spindle of the finished machine, except that only one roller bearing 63 is employed, while the spacer 64 between the roller bearings and the outer race of the other roller bearing 65 remain in place. The rear end of the spindle 62 is adjustably mounted in a steady rest 66 secured to the head end of the lathe bed and the steady rest includes four adjustable slides 67 each carrying a roller which engages the spindle. It will be understood that the slides 67 may be adjusted radially inwardly or outwardly with respect to the axis of the bearings in the head by means of the adjusting screws 68, see Fig. 14. The spindle 62 is held against endwise movement by means which will now be described and which is located adjacent to the bearing 30a.

It will be understood, of course, that the roller bearing 63 being of tapered form holds the spindle 62 against movement in a left-hand direction as viewed in the drawings. In order to hold the spindle against movement in the right-hand direction a ring 69 is carried by the spindle 62 and is splined thereto and carries at its circumference a ball thrust bearing 70 which bears against a stationary ring 71 in turn engaging the inner surface of the head surrounding the bearing 30a. The ring 69 is held in tensioned engagement with the ball bearings 70 by means of spring pressed plungers 72 carried by a circular bracket 73 slidably mounted on the spindle 62 and held in position by means of a nut 74 that is screwed upon a threaded portion of the spindle. It will be seen that when the nut 74 is turned in the proper direction the spring pressed plungers 72 will be brought into engagement with the ring 69 and the latter pressed thereby against the ball bearings 70 so that tension will be exerted upon the ring 71 with the result that when the spindle rotates the ring 71 will remain stationary. By employing the arrangement just described and particularly the spring pressed plungers 72, the spindle is so supported that the rear end thereof can be adjustably moved by means of the slides 67 of the steady rest 66 to bring it into axial alignment with the bearing 30a and parallel with the ways of the bed, it being understood that the rollers carried by the slides 67 allow the spindle to rotate freely in such adjusted position.

An adapter 75 is secured to the rear end of the spindle 62 and it is in the adapter that the eye-piece 35 is secured similarly as said eye-piece was secured in the tube 32. The front end of the spindle 62 carries a tube 76 supported in the spindle by means of spaced bushings 77—78 and locked in the bushing 78 by means of a pivoted clamping or locking member 79 and an adjustable screw 80. The tube 76 adjacent its front or outer end is provided with an objective lens 81, see Figs. 11, 16 and 17.

A bracket 82 is secured to the upper side of the head and carries a motor 83, the shaft of which extends downwardly at the front end of the head and is provided with a worm 84 that meshes with a worm wheel 85 secured to the outer end of the spindle 62. It will be understood that when the motor 83 is operated the spindle 62 will be rotated through the worm 84 and worm wheel 85 in the bearing 63 and in the rollers carried by the slides 67 of the steady rest 66. A sleeve 86 is secured to the spindle adjacent to the steady rest and partly within the bearing 29a and said sleeve carries a dovetail slide 87 which has a tool 88 secured thereto, said slide being movable axially of the spindle and bearing by means of a screw 89 which has at its left-hand end, as viewed in the drawings, a star wheel 90 which engages in each revolution of the spindle a pin 91 carried by the steady rest 66. It will be seen that as the spindle 62 is driven by the motor 83 each revolution of the spindle will impart a partial turn to the screw 89 to thus feed the slide 87 and tool 88 forwardly into the bearing 29a to machine the surface thereof.

The manner in which the spindle 62 is brought into alignment with the ways 27a will now be described.

That portion of the optical system carried by the ways 27 in Fig. 1 is utilized in the present instance and comprises the supporting brackets 42 secured to the ways and the tube 47 carried by said brackets. The tube 47 at its left-hand end, as viewed in the drawings, is provided with an objective lens 48, while its right-hand end carries a target 49 in the form of a glass disc and having the crossed spaced hair lines 49a, as previously described. The optical system employed in the set-up illustrated in Figs. 10 and 11 is identical with the set-up illustrated in Figs. 1 and 2 in that the eye-piece 35 contains the eye-lens 38 and field lens 39, while the tube 76 contains the objective lens 81 corresponding to the objective lens 33 in Fig. 2, in other words, the spindle 62 corresponds to the tube 32 of said Fig. 1. Therefore, since the tube 47 is employed in the latter instance it will at once be noted that the optical system is the same as in Fig. 1 and the manner of checking the relationship of the bearings with the ways 27a is likewise the same.

The operator will set the micrometer adjustment at zero and will turn the tube 47 until the hair lines 49a of the target are in the horizontal and vertical positions. Assuming that the hair line of the eye-piece is in the vertical position the operator will now sight the target to determine the displacement between the vertical hair lines of the target and eye-piece. When this has been determined he will then manipulate the slides 67 with their rollers forming the spindle support of the steady rest to shift the end of the spindle horizontally. The operator will check this manipulation and shifting of the end of the spindle until the hair line of the eye-piece lies midway between the vertical hair lines of the target. He will turn the tube 47 a half turn and then observe the displacement between the vertical hair lines of the target and that of the eye-piece, correcting for any such displacement by adjusting the slides 67 to vary the horizontal position of the end of the spindle 62. Following this the operator will turn the eye-piece until the hair line thereof is in the horizontal position and will then sight to check the displacement between the horizontal hair lines of the target and that of the eye-piece and proceed with similar adjustments of the slides 67 to vary the vertical position of the rear end of the spindle 62. After the operator has done this he will turn the tube 47 a half turn and then check the displacement between the horizontal hair line of the eye-piece and those of the target making, if necessary, the requisite adjustments by means of the slides 67 to bring said hair lines into the proper positions.

The rear bearing has now been located in axial alignment with the front bearing and the axes of both the bearings are now parallel to the ways 27a. The operator may thereupon adjust or set the tool 88 in the proper position and start the motor 83 to rotate the spindle 62 and tool 88 to machine the bearing 29a, the star wheel 90 intermittently engaging the pin 91 to feed the tool along its support to machine the bearing.

It will be understood that although in the forms hereinbefore described single cutters have been shown for machining the periphery of the bearings, it is within the concept of the present invention to employ a plurality of cutters if needed for machining the different portions of the bearings.

The bearings of the heads in the machine illustrated both in Fig. 1 and Fig. 10 have now been finished machined and may be checked. This is done by mounting the regular spindle 92 of the machine in the bearings of the head, see Fig. 15, and then by mounting an adapter 93 on the rear end of the spindle and securing the eye-piece 35 in position in said adapter. The tube 76 is then positioned in the front end of the spindle by means of an adapter 94 secured thereto, it being remembered that the tube 76 carries the objective lens 81 which, together with the eye-lens 38 and the field lens 39 of the eye-piece and the objective lens 48 of the tube 47, constitutes the optical system in conjunction with the target 49. The same optical system is diagrammatically shown in Figs. 2, 11 and 16, it being remembered that the optical system shown in Fig. 7 includes only one objective lens and, therefore, inverts the image.

Assuming that the bearings of the head have been correctly machined in axial alignment with each other and in parallelism with the ways of the bed, the hair line of the eye-piece should lie midway between the vertical hair lines or the horizontal hair lines of the target 49, while the tube 47 with its target is located in one position or is moved a half turn therefrom. If any error exists in the axial alignment of the bearings of the head and in the parallel relationship between the axes of the bearings and the ways of the bed the last named inspection will indicate the same, the amount of the displacement being shown by the displacement of the hair line of the eye-piece with respect to the hair lines of the target and being indicated by one half the change shown by the graduations on the micrometer screw when the latter was rotated to bring the hair lines into the proper position.

In Figs. 19 to 22, inclusive, there is illustrated the manner and devices for checking the finished machine with the turret positioned thereon to determine if the openings in the turret are in axial alignment with the spindle and its bearings both when the turret is in its most rearward position and when it has been moved adjacent to the head, thus incidentally establishing the parallel relation between the spindle axis and the ways of the bed.

In installing a machine of this character it sometimes occurs, due to the inaccurate bolting of the machine to its support, that the bed is sprung or warped and the check which is given to the machine and is now to be described would reveal this condition.

The turret slide 95 is provided with an indexible turret 96 having the customary openings 97 therein in which the tools are to be positioned. It is proposed to mount in the openings 97 of the turret a filler bushing 98 into which fits the bushing 57 carrying the target 58. A tube 99 is secured in the rear end of the spindle by an adapter 100 and carries the eye-piece 35. The tube 99 is provided with relatively small equally spaced objective lenses 101 and with a larger objective lens 102 at the end of the tube, the arrangement of lenses being such that a relatively short tube can be used. The optical system further includes the eye-lens 38 and field lens 39 on the eye-piece 35 and the target 58, as shown diagrammatically in Fig. 20.

The turret 96 being positioned adjacent the end of the bed with the target 58 directed toward the spindle of the head with the hair lines vertical and horizontal and the hair line of the eye-piece vertical, the operator now sights the target through the eye-piece and adjusts the micrometer slide to bring the hair line of the eye-piece between the vertical hair lines of the target. He then turns the tube 99 a half turn to again bring the hair line of the eye-piece into parallelism with the vertical hair lines of the target noting if there is any displacement indicating a misalignment in the horizontal plane of the bearings with the opening in the turret. The operator now proceeds to check the alignment of the bearings and the opening of the turret in the vertical plane, it being understood that this is done by noting the displacement, if any, of the hair line of the eye-piece with respect to the horizontal hair lines of the target. All of the openings of the turret are checked in a similar manner, as will be well understood, to determine if the same are in axial alignment with the spindle. The reading of the last turret opening checked is noted and then the turret slide and turret are moved to a point adjacent the head, as indicated in dotted lines in Fig. 19. A similar checking of the alignment between the axis of the spindle and the center of the last turret opening previously checked is carried out. It will be understood that the tests just referred to will indicate any error in the parallel relationship between the axis of the spindle and the ways of the bed, since the turret is moved from adjacent the end of the bed to a position adjacent the head and since the center of the target 58 will travel in parallel relationship with the ways.

If desired similar tests may be made when the machine has been finally installed to determine if the bolting of the machine to the floor or support has caused any displacement in the proper relationship of the parts thereof and, if such has occurred, suitable corrective measures may be taken to correctly bolt the machine to the floor or support.

Although it is preferred to use an eye-piece having a single micrometer slide equipped with one hair line, such as has been hereinbefore described, and to check the relationship of the parts in different planes by turning the eye-piece or another portion of the optical system, it is clearly within the contemplation of the present invention to employ an eye-piece having a pair of micrometer slides 103 and 104 movable angularly with respect to each other as illustrated in Fig. 23. It will be understood that when this last mentioned form of eye-piece is employed it will be unnecessary in checking the relationship of the parts to turn the eye-piece or some other portion of the optical system for readings in different planes, since the crossed hair lines of the eye-piece may be compared with the crossed hair lines of the target and their displacement with respect thereto in said planes individually adjusted by means of the micrometer screws and knobs 105 and 106, the error in each plane being indicated by the graduations on the knobs. Referring to Fig. 24, the target is indicated at 49 and the crossed hair lines thereof at 49a as in the previously explained views (Figs. 2b and 2c). The crossed hair lines of the micrometer slides 103, 104 of the eye-piece are indicated in a displaced position with respect to the hair lines of the target by the dotted line arrows and in the centered position by the full line arrows.

From the foregoing description it will have been seen that the present invention provides a simple yet extremely accurate method and devices for locating the relationship between the parts of an apparatus and for determining the magnitude of any error existing in such relationship. It will further be seen that the methr and devices of the invention provide for precision work and yet are of such character that they may be performed by a mechanic of ordinary skill.

The invention, by employing an optical system, magnifies any error existing in the relationship of different parts of an apparatus so that it is possible for the operator to clearly visualize such magnified error and its practice eliminates the use of mechanical tools, such as indicators, micrometers, calipers and the like at present being used for determining such errors in the relationship of the parts.

In order to clearly set forth the invention and to bring out the advantages present therein a resumé of the manner in which the invention is practiced will now be briefly set forth.

After the apparatus, such as a lathe bed, has been made and the ways finished machined and the bearings in the head roughly machined, the optical system is mounted on the ways and in the bearings as shown in Fig. 1, and the alignment of the roughly machined bearings and the parallelism between the axes of the bearings and the ways are then checked and the degree of error determined. It will be understood that in certain instances the ways might have other relationships to the bearings than a parallel relationship and such other relationships may be checked in accordance with the present invention. After this step has been taken if the lathe bed is of small size it may be mounted upon the table of a boring mill as shown in Fig. 6, and by means of the optical system, the aligned position of the bearings of a boring bar is determined and then the boring bar is mounted in such bearings, as shown in Fig. 9, and the accurate and finished machining of the bearings of the lathe bed is then carried out.

However, if the lathe bed is too large to be conveniently mounted upon the table of a boring mill, the system illustrated in Fig. 10 is followed, wherein a temporary boring spindle 62 is mounted in the head, the front bearing of the head having been finished machined in the usual way and the rear bearing having been roughly machined. The boring spindle is supported at its rear end by adjustable rollers and slides carried in a steady rest so that the rear end of the spindle can be moved into axial alignment with the front bearing and the axis of the spindle brought into parallelism with the ways of the bed. The invention enables this to be accurately done by means of the optical system, since the operator, by steps of visual checks and adjustments, can bring the boring spindle into the required position. When the spindle has been properly positioned, it is set into rotation so that the cutting tool carried thereby will finish machine the rear bearing.

Then proceeding to the showing of Fig. 15, it will be noted that the regular spindle of the lathe is mounted in the bearings and the parallel relationship of its axis with the ways of the bed is now checked by means of the optical system. The apparatus may now be completely assembled and the turret and turret slide mounted thereon. Then, as shown in Fig. 19, the optical system is employed to check the location of the openings in the indexible turret when the latter is in a position remote with respect to the head and also to check the parallel relationship between the axis of the spindle and the ways of the bed by moving the turret from the remote position to a point adjacent the head and then checking the last opening checked in said remote position. The apparatus has now been completed and the bearings are in axial alignment and the axis of the spindle is parallel with the ways of the bed.

It is well known that machine tools and other apparatus, even though sturdily constructed, may be warped by bolting the same inaccurately to the floor or support during their installation. The present invention provides advantageous means for checking the parallelism between the axis of the spindle and the ways of the bed after the machine has been bolted to the floor or support to determine if the relationship between the parts has been disturbed, such as warping of the bed. If the machine has been inaccurately bolted to the floor, that fact will be revealed by use of the optical system and can then be corrected.

A further advantage residing in the present invention is that the optical system thereof, such as shown in Figs. 19 and 20, can be employed to determine if any uneven wear has occurred on the parts during use of the machine which would destroy the correct relationship therebetween, as, for example, wear on the spindle bearings or wear on the ways of the bed.

It should be observed that, in performing the checks referred to, it is necessary merely to use the target and bushing and the short tube and eye-piece, see Fig. 19, to definitely determine the relationship between the parts of the apparatus. Heretofore, it has been necessary to employ cumbersome bars and indicators for this purpose. The use of the bars presents disadvantages in connection with beds of any great length since one end of the bar is secured in the spindle while the other end carries an indicator and projects into an opening of the indexible turret to test the alignment of the opening and the spindle bearings. The great length of the bar is apt to result in sagging or deflection thereof.

Although several embodiments of the invention have been illustrated and described herein, it will be understood that the invention is susceptible of various modifications and adaptations within the scope of the appended claims.

Having thus described my invention, I claim:

1. The method of constructing a machine tool having parts in exact predetermined relationship which comprises forming said machine tool with the parts substantially in said relationship, checking the parts by an optical system to determine the degree of error existing therein from said relationship, and then machining the parts to effect the said exact relationship.

2. The method of constructing a machine tool having parts in exact predetermined relationship which comprises forming said machine tool with the parts substantially in said relationship, checking the parts by an optical system to determine the degree of error existing therein from said relationship, and then positioning a device by means of said optical system to machine the parts to the said exact relationship.

3. The method of constructing a machine tool having parts in exact predetermined relationship which comprises forming said machine tool with the parts substantially in said relationship, checking the parts by an optical system to determine the degree of error from said relationship, then positioning a device by means of said optical system to machine the parts to the said exact relationship, and then rechecking said relationship between the parts by said optical system.

4. The method of constructing a machine tool having ways and bearings for a spindle the axis of which is in exact predetermined relationship with respect to the ways which comprises forming the machine tool with the spindle axis substantially in the said relationship with respect to the ways, checking by an optical system the relationship between the spindle axis and the ways to determine the error existing therein, and then positioning in the bearings by means of said optical system a device to machine the bearings to effect the said exact relationship between the axis of the spindle and the ways.

5. The method of constructing a machine tool having ways and bearings for a spindle the axis of which is in exact predetermined relationship to the ways, which comprises forming the machine tool with the spindle axis substantially in said relationship to the ways and with one of the bearings in finished form and another of the bearings roughly machined, checking by an optical system the relationship between the axis of the spindle and the ways to determine the error therein, and then positioning a device by means of said optical system to finish machine the rough bearing to effect the exact relationship between the spindle axis and the ways.

6. The method of checking the parallel relationship between the ways and the spindle axis of a turret lathe which comprises checking by means of an optical system the axial alignment between the spindle and an opening in the turret when the latter is remote from the end of the spindle, and then checking said axial alignment by said optical system when the turret is moved adjacent the end of the spindle to determine the degree of error in the parallel relationship of the spindle axis and the ways.

7. An optical system adapted to be used with apparatus having parts arranged in predetermined relationship comprising an optical means arranged in predetermined relation with one of said parts and another optical means arranged in predetermined relation with another of said parts and provided with a tool for machining said part, said optical means determining the error in the relationship between said parts and the positioning of said tool for machining the adjacent part to correct said error.

8. An optical system adapted to be used with a machine tool having a bed provided with ways and a head provided with bearings for a spindle the axis of which should be in exact predetermined relationship with respect to the ways and comprising an optical device arranged in predetermined relationship with respect to the ways and a second optical device supported in said bearings and comprising a spindle, and means for moving one end of said spindle in radial directions to bring the axis thereof into correct relationship with the ways as determined by the optical devices.

9. An optical system adapted to be used with a machine tool having a bed provided with ways and a head provided with bearings for a spindle the axis of which should be in exact predetermined relationship with respect to the ways and comprising an optical device arranged in predetermined relationship with respect to the ways and a second optical device supported in said bearings and including a spindle, means for moving one end of said spindle in radial directions to bring the axis thereof into correct relationship with the ways as determined by the optical devices, said spindle being adapted to carry a tool for machining one of said bearings.

10. An optical system adapted to be used with a machine tool having a bed provided with ways and a head provided with bearings for a spindle the axis of which should be in exact predetermined relationship with respect to the ways and comprising an optical device carried by said ways in predetermined relationship therewith and an optical device arranged in said head and supported by one of the bearings therein and extending through another of the bearings and having a radial movement in said last named bearing, and a steady rest secured to said head and including slides adjustable radially with respect to said spindle and forming a support for the end thereof.

HAL L. COOK.